(12) United States Patent
Banker et al.

(10) Patent No.: US 10,208,657 B2
(45) Date of Patent: Feb. 19, 2019

(54) DIAGNOSTIC METHOD FOR A COMPRESSOR RECIRCULATION VALVE

(71) Applicant: Ford Global Technologies, LLC, Dearborn, MI (US)

(72) Inventors: Adam Nathan Banker, Canton, MI (US); Baitao Xiao, Canton, MI (US); Hamid-Reza Ossareh, South Burlington, VT (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/853,130

(22) Filed: Dec. 22, 2017

(65) Prior Publication Data

US 2018/0112591 A1    Apr. 26, 2018

Related U.S. Application Data

(62) Division of application No. 14/565,098, filed on Dec. 9, 2014, now Pat. No. 10,012,137.

(51) Int. Cl.
| | |
|---|---|
| *F02B 37/18* | (2006.01) |
| *F02D 41/00* | (2006.01) |
| *G01L 27/00* | (2006.01) |
| *F02B 37/16* | (2006.01) |
| *F02D 41/22* | (2006.01) |
| *F02B 37/007* | (2006.01) |

(52) U.S. Cl.
CPC ........... *F02B 37/183* (2013.01); *F02B 37/16* (2013.01); *F02D 41/0007* (2013.01); *F02D 41/221* (2013.01); *F02D 41/222* (2013.01); *G01L 27/007* (2013.01); *F02B 37/007* (2013.01); *F02D 2200/0406* (2013.01); *Y02T 10/144* (2013.01); *Y02T 10/40* (2013.01)

(58) Field of Classification Search
CPC ...... F02B 37/183; F02B 37/16; F02B 37/007; F02D 41/222; F02D 41/221; F02D 41/007; F02D 2200/0406; G01L 27/007; Y02T 10/144; Y02T 10/40
USPC .......................................................... 60/611
See application file for complete search history.

(56) References Cited

U.S. PATENT DOCUMENTS

| | | | |
|---|---|---|---|
| 2,988,070 | A | 6/1961 | Brueder |
| 4,677,542 | A | 6/1987 | Kasten |
| 4,870,822 | A | 10/1989 | Kamimaru |
| 5,079,946 | A | 1/1992 | Motamedi et al. |

(Continued)

OTHER PUBLICATIONS

Watson, N. et al., "The Radial Flow Compressor: Compressor Characteristics and Flow Range: Compressor Instability—Chapter 3.7.1 of Turbocharging the Internal Combustion Engine," The MacMillan Press Ltd., 1st Edition, Available as Early as Jan. 1982, 3 pages.

*Primary Examiner* — Jason Newton
(74) *Attorney, Agent, or Firm* — Julia Voutyras; McCoy Russell LLP

(57) ABSTRACT

Methods are provided for identifying degradation in components of a compressor recirculation valve (CRV). One method includes differentiating between degradation of a throttle of the CRV and a position sensor of the CRV based on each of a throttle inlet pressure and commanded position of the throttle of the CRV. The method also includes utilizing output from the position sensor of the CRV in response to the commanded position of the throttle of the CRV.

4 Claims, 8 Drawing Sheets

(56) References Cited

U.S. PATENT DOCUMENTS

| | | |
|---|---|---|
| 5,213,080 A | 5/1993 | Lambert et al. |
| 5,275,136 A | 1/1994 | Schechter et al. |
| 7,557,530 B2 | 7/2009 | Tesch et al. |
| 7,578,128 B2 | 8/2009 | Miyauchi et al. |
| 7,926,335 B2 | 4/2011 | Wegener et al. |
| 7,983,834 B2 | 7/2011 | Blumendeller |
| 8,417,484 B2 | 4/2013 | Ringeisen |
| 8,661,814 B2 | 3/2014 | Ulrey et al. |
| 9,441,568 B2 | 9/2016 | Ossareh et al. |
| 9,506,474 B2 | 11/2016 | Xiao et al. |
| 9,528,430 B2 | 12/2016 | Banker et al. |
| 9,631,564 B2 | 4/2017 | Ossareh et al. |
| 9,670,861 B2 | 6/2017 | Jankovic et al. |
| 9,702,298 B2 | 7/2017 | Ossareh et al. |
| 9,810,229 B2 * | 11/2017 | Banker ............... F02D 23/02 |
| 2012/0210711 A1 | 8/2012 | Petrovic et al. |
| 2012/0291432 A1 | 11/2012 | Ulrey et al. |
| 2014/0238369 A1 | 8/2014 | Jankovic et al. |
| 2014/0260241 A1 * | 9/2014 | Jankovic ............... F02D 23/02 60/602 |
| 2015/0047341 A1 | 2/2015 | Ulrey et al. |
| 2015/0047342 A1 | 2/2015 | McConville et al. |
| 2015/0047343 A1 | 2/2015 | McConville et al. |
| 2015/0047605 A1 | 2/2015 | Buckland et al. |
| 2015/0096296 A1 * | 4/2015 | Banker ............... F02D 23/02 60/611 |
| 2015/0159601 A1 * | 6/2015 | Luehrsen ......... F02M 35/10118 123/564 |
| 2016/0131065 A1 * | 5/2016 | Ossareh ............... F02D 41/22 701/103 |
| 2016/0160746 A1 * | 6/2016 | Banker ............... F02B 37/183 60/602 |
| 2016/0160747 A1 * | 6/2016 | Ossareh ............... F02B 37/183 60/600 |
| 2016/0160806 A1 * | 6/2016 | Xiao ............... F02D 13/0203 123/568.11 |
| 2016/0160868 A1 * | 6/2016 | Xiao ............... F04D 17/10 415/1 |
| 2016/0169089 A1 | 6/2016 | Xiao et al. |
| 2016/0169092 A1 | 6/2016 | Ossareh et al. |
| 2017/0045019 A1 * | 2/2017 | Dudar ............... F02M 25/0836 |
| 2017/0138278 A1 | 5/2017 | Xiao et al. |
| 2017/0138279 A1 | 5/2017 | Xiao et al. |
| 2017/0226941 A1 | 8/2017 | Ossareh et al. |

* cited by examiner

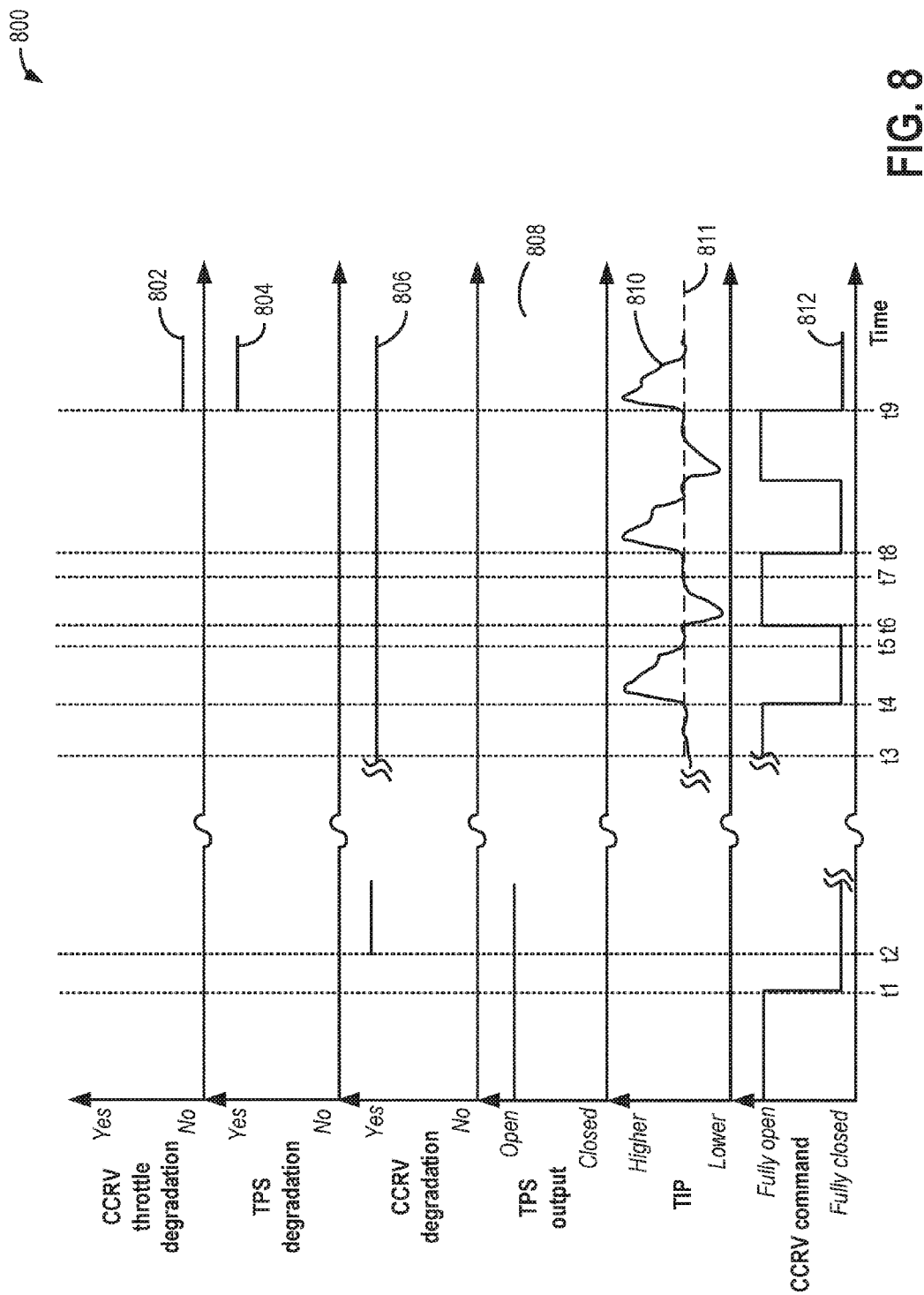

US 10,208,657 B2

DIAGNOSTIC METHOD FOR A COMPRESSOR RECIRCULATION VALVE

CROSS REFERENCE TO RELATED APPLICATION

The present application is a divisional of U.S. patent application Ser. No. 14/565,098, entitled "DIAGNOSTIC METHOD FOR A COMPRESSOR RECIRCULATION VALVE," filed on Dec. 9, 2014. The entire contents of the above-referenced application are hereby incorporated by reference in its entirety for all purposes.

FIELD

The present application relates to methods for diagnosing degradation in a compressor recirculation valve coupled across an intake compressor included in an internal combustion engine.

BACKGROUND AND SUMMARY

Engine systems may be configured with boosting devices, such as turbochargers or superchargers, for providing a boosted aircharge and improving peak power outputs. The use of a compressor allows an engine with smaller displacement to provide as much power as a larger displacement engine, but with additional fuel economy benefits. However, compressors are prone to surge. For example, when an operator tips-out of an accelerator pedal, an engine intake throttle closes, leading to reduced forward flow through the compressor, and a potential for surge. Surge can lead to noise, vibration, and harshness (NVH) issues such as undesirable noise from the engine intake system. In extreme cases, surge may result in compressor damage. To address compressor surge, engine systems may include a compressor recirculation valve (CRV) coupled across the compressor to enable rapid decaying of boost pressure. The CRV may recirculate compressed air from the compressor outlet to the compressor inlet allowing a decrease in pressure at the compressor outlet.

The CRV may comprise a throttle and a position sensor for indicating a change in a position of the throttle of the CRV. Degradation of the CRV may be diagnosed when the position sensor does not register a change in the position of the throttle in response to a command to alter throttle position. For example, the throttle of the CRV may be stuck at a given position. Another example approach to diagnose degradation of the CRV is shown by Wegener et al. in U.S. Pat. No. 7,926,335. Herein, changes in charging pressure in response to a triggering of the CRV are analyzed. Specifically, the CRV may be diagnosed to be stuck in a mostly open position if the charging pressure downstream of an intake compressor does not increase as expected when the CRV is triggered to a closed position.

The inventors herein have identified potential issues with the above approaches. As an example, degradation of the CRV may be due to degradation in a specific component of the CRV. For example, the throttle of the CRV may be stuck and/or the position sensor of the CRV may be degraded. Thus, an indication of degradation based on the position sensor not registering a change in position may be for the CRV as a whole and may not identify specific component degradation. Further, by monitoring changes in charging pressure as shown in U.S. Pat. No. 7,926,335, degradation of the CRV throttle may be detected whereas degradation of the position sensor of the CRV may not be specifically diagnosed. As such, U.S. Pat. No. 7,926,335 primarily detects a CRV that is stuck in an open or mostly open position.

In one example, some of the above issues may be addressed by a method for a boosted engine, comprising differentiating between degradation of a throttle of a compressor recirculation valve (CRV) and a position sensor of the CRV based on each of a throttle inlet pressure and commanded position of the throttle of the CRV. Accordingly, component specific degradation may be identified.

For example, an engine system may include a compressor having a compressor recirculation passage coupling an outlet of the compressor to the compressor inlet. In alternate embodiments, the recirculation path may couple an outlet of a charge air cooler to the compressor inlet. Flow through the recirculation path may be controlled via a compressor recirculation valve (CRV). The CRV may be a continuously variable compressor recirculation valve (CCRV). An engine controller may be configured to adjust a position of the CRV based on changes in airflow through an intake throttle so as to reduce compressor surge. Further, the engine controller may receive signals from a position sensor of the CRV confirming the adjusted position of the CRV, particularly the throttle of the CRV. Additionally, a throttle inlet pressure sensor located upstream of the intake throttle and downstream of the compressor may communicate changes in throttle inlet pressure (TIP) to the controller. The controller may, thus, command a change in position of the CRV, receive feedback from the position sensor of the CRV to confirm the change in position, and receive indication of resulting changes in TIP from the TIP sensor. If the position sensor indicates a lack of change in the position of the CRV in response to the commanded change in position, yet an expected change in TIP is observed, the position sensor may be diagnosed to be degraded. Alternatively, if the position sensor indicates a lack of change in the position of the CRV in response to the commanded change in position, and the expected change in TIP is not observed, the throttle of the CRV may be diagnosed to be degraded.

In this way, a distinction between degradation of the CRV throttle and degradation of the CRV position sensor may be accomplished. By identifying the specific component of the CRV that is degraded, a more accurate remedial action may be taken. As such, cost of repair may also be reduced by identifying the specific degraded component in the CRV. Further, ascertaining specific component degradation may be easily achieved by simply monitoring TIP and the output of the position sensor in the CRV in response to a command to the CRV by the controller. Thus, additional sensors may not be required. Overall, a more accurate determination of degradation in the CRV may be achieved without an increase in expenses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 portrays an example operation for diagnosing the CRV throttle based on throttle inlet pressure (TIP) while reducing noise from other factors that may affect TIP readings.

DETAILED DESCRIPTION

Figure 1:
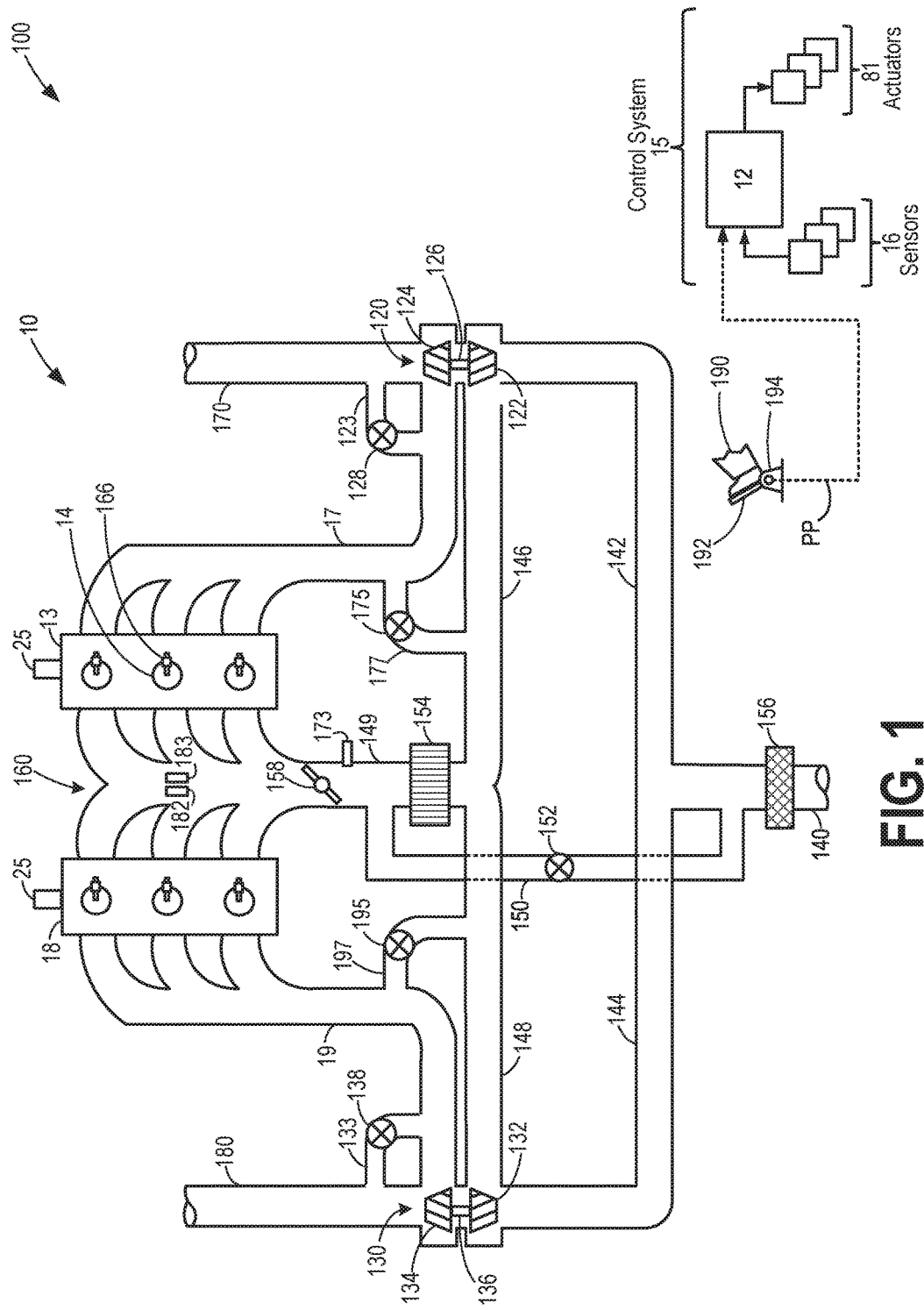
FIG. 1 depicts an example embodiment of a boosted engine system including a compressor recirculation valve (CRV).

The following description relates to systems and methods for diagnosing degradation in a compressor recirculation valve (CRV) in a boosted engine system, such as the system of FIG. 1. A controller may be configured to perform a control routine, such as the routine of FIG. 2, to determine if the CRV is degraded. As such, the CRV may include a throttle whose position may be adjusted by the controller based on engine conditions. The CRV may also comprise a position sensor for confirming the change in position of the throttle of the CRV in response to a command by the controller. The controller may differentiate between degradation of the throttle of the CRV and degradation of the position sensor of the CRV by performing a control routine, such as the routine of FIG. 3, during engine operation. Degradation of the throttle of the CRV may be distinguished from degradation of the position sensor of the CRV based on each of a throttle inlet pressure, and a commanded position of the throttle of the CRV. Additionally, an output of the position sensor in response to the commanded position of the throttle of the CRV may be used to differentiate between degradation of the throttle and degradation of the position sensor of the CRV (FIG. 7). In response to the determination of CRV degradation, various engine parameters and actuators may be adjusted to enable desired engine operation (FIG. 4). Additional confirmation of degradation in the position sensor or throttle of the CRV may be provided by activating a routine such as that shown in FIG. 5, via operator input. Further still, the controller may be configured to perform a control routine, such as the routine in FIG. 6, to ensure that changes in throttle inlet pressure are due to adjustments in the position of the CRV. Specifically, degradation of the CRV throttle may be determined by commanding a periodic signal to the CRV and observing variations in throttle inlet pressure (FIG. 8). In this way, degradation of the CRV throttle may be isolated from degradation of the position sensor of the CRV, and CRV maintenance may be enhanced.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. Engine system 100 may be a split-engine system wherein intake passage 140 is branched downstream of air filter 156 into first branch and second branch intake passages, each including a turbocharger compressor. In the resulting configuration, at least a portion of intake air is directed to compressor 122 of turbocharger 120 via a first branch intake passage 142 and at least another portion of the intake air is directed to compressor 132 of turbocharger 130 via a second branch intake passage 144 of the intake passage 140.

The first portion of the total intake air that is compressed by compressor 122 may be supplied to intake manifold 160 via a first parallel branched intake passage 146. In this way, intake passages 142 and 146 form a first combined branch of the engine's air intake system. Similarly, a second portion of the total intake air can be compressed via compressor 132 and may be supplied to intake manifold 160 via second parallel branched intake passage 148. Thus, intake passages 144 and 148 form a second combined branch of the engine's air intake system. As shown in FIG. 1, intake air from intake passages 146 and 148 can be recombined via a common intake passage 149 before reaching intake manifold 160, where the intake air may be provided to the engine.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Common intake passage 149 may include a charge air cooler 154 and an intake throttle 158. The position of intake throttle 158 can be adjusted via a throttle actuator (not shown) communicatively coupled to controller 12. A throttle inlet pressure (TIP) sensor 173 may be coupled to common intake passage 149 at a location upstream of intake throttle 158 and downstream of air cooler 154. Further, TIP sensor 173 may be located downstream of compressors 122 and 132. Throttle inlet pressure, also referred to as the boost pressure or charging pressure, may be estimated by TIP sensor 173.

A compressor recirculation passage 150 may be provided for compressor surge control. Specifically, to reduce compressor surge, such as on a driver tip-out, boost pressure may be dumped from the intake manifold, from downstream of air cooler 154 and upstream of intake throttle 158, to intake passage 140 (in particular, downstream of air filter 156 and upstream of the junction of intake passages 142 and 144). By flowing boosted air from upstream of an intake throttle inlet to upstream of the compressor inlets, boost pressure may be rapidly reduced, expediting boost control.

Flow through compressor recirculation passage 150 may be regulated by adjusting the position of compressor recirculation valve 152 (CRV 152) positioned therein. CRV 152 may also be termed a compressor surge valve, a compressor bypass valve (CBV), a diverter valve, etc. In the depicted example, compressor recirculation valve 152 may be a continuously variable valve whose position can be adjusted to a fully open position, a fully closed position, or any position there-between. Thus, compressor recirculation valve 152 may also be referred to herein as a continuously variable compressor recirculation valve, or CCRV. In the depicted example, CCRV 152 is configured as a throttle valve, although in other embodiments, the CCRV may be configured differently (e.g., as a poppet valve). Accordingly, CCRV 152 may include a throttle (e.g. as a throttle plate) as well as a position sensor for communicating a change in position of the throttle of the CCRV to the controller 12. The position sensor for the throttle of the CCRV (or simply CRV) may also be referred to as throttle position sensor (TPS) or CCRV throttle position sensor. It will be appreciated that while the CCRV is shown configured for a V-6 twin turbocharged engine in FIG. 1, the CCRV may be similarly applied in other engine configurations, such as applied to I-3, I-4, V-8, and other engine configurations with one or multiple turbochargers.

In an alternate configuration, the compressor recirculation passage may be located such that compressed air flows from upstream of air cooler 154 to a location upstream of compressors 122 and 132. In another configuration, there may be two recirculation paths, each with a recirculation valve, each located such that compressed air travels from the compressor exit to the compressor inlet. It will also be appreciated that the methods described herein may be applied to a compressor recirculation valve that is not continuously variable.

During nominal engine operating conditions, the continuously variable compressor recirculation valve 152 may be kept nominally closed, or nearly closed. In such a position, the valve may be operating with known or negligible leakage. Then, in response to surge, an opening of the CCRV 152 may be increased. In some embodiments, one or more sensors may be coupled in compressor recirculation passage 150 to determine the mass of recirculated flow delivered from the throttle inlet to the intake passage. The various sensors may include, for example, pressure, temperature, and/or flow sensors.

In alternate embodiments, the compressor recirculation valve may be configured as a two-position valve adjustable to one of a fully closed and a fully open position. However, boost regulation may be improved by using a CCRV. In addition, by coordinating the operation of the CCRV with those of a wastegate, boost response and surge margins can be improved. As such, the impact of the opening or closing of the CCRV 152 on boost pressure may be substantially immediate. This allows rapid boost and surge control.

Engine 10 may include a plurality of cylinders 14. In the depicted example, engine 10 includes six cylinders arranged in a V-configuration. Specifically, the six cylinders are arranged on two banks, first bank 13 and second bank 18, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted via bank-specific parallel exhaust passages. In the depicted example, first bank 13 of cylinders of engine 10 can exhaust products of combustion via a first parallel exhaust passage 17 and second bank 18 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass exhaust turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of intake passage 144 of the engine's intake system. Alternatively, some or all of the exhaust gas flowing through exhaust passage 19 can bypass exhaust turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors (not shown).

In some embodiments, engine 10 may further include one or more exhaust gas recirculation (EGR) passages for recirculating at least a portion of exhaust gas from first and second parallel exhaust passages 17 and 19 and/or first and second parallel branched exhaust passages 170 and 180, to first branch and second branch intake passages 142 and 144, and/or first and second parallel branched intake passages 146 and 148 or intake manifold 160. These may include high-pressure EGR loops for providing high-pressure EGR (HP-EGR) and low-pressure EGR-loops for providing low-pressure EGR (LP-EGR). When included, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously. The low-pressure EGR loops may recirculate at least some exhaust gas from each of the branched parallel exhaust passages, downstream of the exhaust turbine, to the corresponding branch of intake passage, upstream of the compressor. Each of the LP-EGR loops may have corresponding LP-EGR valves, for controlling exhaust flow through the LP-EGR loop, as well as respective charge air coolers for lowering a temperature of exhaust gas recirculated to the engine intake. The high-pressure EGR loops may recirculate at least some exhaust gas from each of the parallel exhaust passages, upstream of the exhaust turbine, to the corresponding parallel intake passage, downstream of the compressor. As shown, high-pressure EGR loop 177 can recirculate a portion of exhaust gas from first parallel exhaust passage 17 to first parallel branched intake passage 146. Similarly, high-pressure EGR loop 197 may recirculate at least some exhaust gas from second parallel exhaust passage 19 to second parallel branched intake passage 148. EGR flow through the HP-EGR loops may be controlled via respective HP-EGR valves and HP-EGR charge air coolers (not shown). Thus, EGR flow through high-pressure EGR loop 197 may be controlled by HP-EGR valve 195, while EGR flow through high-pressure EGR loop 177 is controlled by HP-EGR valve 175.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. Cam actuation systems may include one or more cams mounted on one or more camshafts and may utilize one or more of cam profile switching (CPS), variable cam timing (VCT), variable valve timing (VVT) and/or variable valve lift (VVL) systems that may be operated by controller 12 to vary valve operation.

Engine system 100 may be controlled at least partially by a control system 15 including controller 12 and by input from a vehicle operator 190 via an input device 192. In this example, input device 192 includes an accelerator pedal and a pedal position sensor 194 for generating a proportional pedal position signal PP.

Control system 15 is shown receiving information from a plurality of sensors 16 (various examples of which are described herein) and sending control signals to a plurality of actuators 81. As one example, sensors 16 may include TIP sensor 173, a humidity sensor, MAP sensor 182, and MCT sensor 183. In some examples, a throttle inlet temperature sensor for estimating a throttle air temperature (TCT) may be located upstream of intake throttle 158. In other examples, one or more of the EGR passages may include pressure, temperature, and air-to-fuel ratio sensors, for determining EGR flow characteristics. As another example, actuators 81 may include CCRV 152, fuel injector 166, HP-EGR valves 175 and 195, LP-EGR valves (not shown), intake throttle 158, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 2-6.

The present disclosure describes methods to distinguish between degradation of a throttle of a CCRV and degradation of a position sensor of the CCRV. It will be noted that throughout the disclosure CRV and CCRV may be used interchangeably to represent the compressor recirculation valve which may be continuously variable. In one example, the throttle of the CCRV may be degraded and may be stuck in an open (or mostly open) position. Herein, boost created by the compressor(s) may be continuously bled off impacting torque delivery and drivability. In another example, the throttle of the CCRV may be degraded and stuck in a closed (or mostly closed) position. Accordingly, the CCRV may not reduce compressor surge, as desired, which can lead to noise, vibration and harshness (NVH) issues as well as compressor degradation. In yet another example, the position sensor of the CCRV may be degraded. For example, wiring and/or processing circuitry within the position sensor may be degraded. Thus, the position sensor may provide incorrect indications of throttle position of the CCRV. Further, accurate control of the position of the throttle of the CCRV may not be possible. Accordingly, identification of degradation in specific components may be advantageous for engine control as well as for reducing repair costs.

As a first step, the controller in the vehicle may identify CCRV degradation when the position sensor of the CCRV does not indicate an expected change in position of the CCRV throttle in response to a commanded change in position of the CCRV throttle. CCRV degradation may include one or more of degradation of the throttle of the CCRV and degradation of the position sensor of the CCRV. Based on engine conditions, the controller may then identify which of the components of the CCRV may be degraded. Herein, a distinction may be based upon each of a change in throttle inlet pressure (TIP) as measured by a TIP sensor, and a commanded change in position of the CCRV throttle. Further, the output of the position sensor of the CCRV throttle may be used in addition to TIP readings and the commanded change in position of the CCRV throttle to identify component specific degradation in the CCRV.

If engine conditions cannot distinguish between throttle and position sensor degradation in the CCRV, component specific degradation may be detected via operator input. Herein, the operator may initiate a diagnostic routine wherein the controller may command a change in position of the CCRV throttle, measure a corresponding change (or lack of change) in TIP, and determine which specific component of the CCRV is degraded. Additionally or alternatively, CCRV throttle degradation may also be determined by commanding a periodic signal to the CCRV throttle via operator input. As such, this diagnostic may also ensure that the TIP as estimated by the TIP sensor is not affected by noise from other engine parameters. The periodic signal may be a square waveform with a period based on turbo-dynamics. Resulting changes in TIP may be measured and CCRV throttle degradation may be indicated if the changes in TIP do not substantially correspond to the frequency and periodicity of the commanded signal. If changes in TIP substantially correspond to the periodicity of the commanded signal, the throttle of the CCRV may be determined to be robust.

Further details will be described in reference to routines shown in FIGS. 2-6 below. It will be noted that routines 200, 300, 400, 500, and 600 refer to the position sensor of the CCRV as TPS (throttle position sensor) wherein the TPS output indicates a position of the CCRV throttle and/or indicates changes in the position of the CCRV throttle. Further, a commanded signal or position change to the CCRV indicates a commanded change in position of the CCRV throttle. It will also be noted that routines 200, 300, 400, 500, and 600 refer to the CRV as CCRV indicating that the compressor recirculation valve is a continuously variable compressor recirculation valve, as in FIG. 1. As such, the CCRV may be adjusted to a fully open position, a fully closed position, or any position in-between the fully closed and fully open positions.

Figure 2:
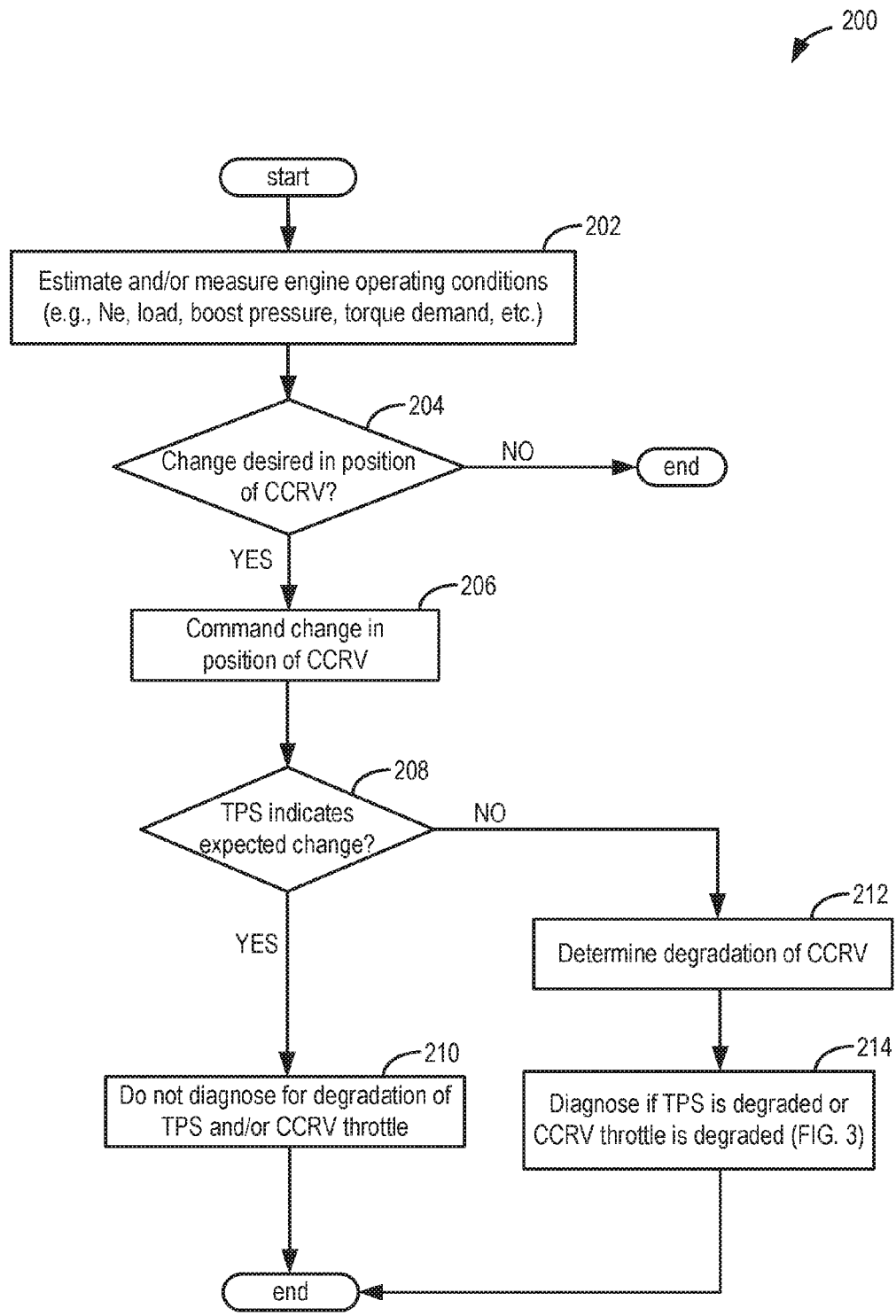
FIG. 2 portrays a high level flow chart illustrating a routine to determine if degradation of the CRV is present.

FIG. 2 presents an example routine 200 for determining if CRV (or CCRV) degradation is present in a boosted engine, such as the engine system of FIG. 1. Specifically, CRV degradation may be likely when a position sensor of the CRV does not indicate an expected change in position of the CRV throttle in response to a commanded change in position.

At 202, routine 200 may estimate and/or measure one or more engine operating conditions. Engine operating conditions may include engine load, boost pressure (or TIP), engine speed, torque demand, air-fuel ratio, a duration of engine operation, exhaust temperature, etc. For example, TIP may be estimated to determine if surge conditions may be present. In another example, torque demand and boost may be estimated to determine if turbocharger spool-up is desired.

At 204, routine 200 may determine if a change in CRV (or CCRV) position is desired. As an example, if surge conditions are present, the CCRV may be adjusted from a mostly closed position to an open (or mostly open) position. In another example, if turbocharger spool-up is desired, the CCRV may be adjusted to a more closed (or fully closed) position from a mostly open position. If it is determined at 204 that a change in CCRV position is not desired, routine 200 may not continue and may end. On the other hand, if a change in CCRV position is demanded, at 206, routine 200 commands the desired change in CRV position. In one example, to reduce surge, the CCRV may be commanded to a more open position. In another example, the CCRV may be commanded to a more closed position for enabling an increase in boost levels.

At 208, routine 200 determines if the position sensor of the CCRV throttle indicates the expected change in position. In one example, if the CCRV throttle has been commanded to a mostly open position from a mostly closed position, the position sensor may signal the corresponding change in position of the CCRV throttle responsive to the command. Likewise, in another example, if the CCRV throttle is commanded to a mostly closed position from a fully open position, the position sensor may indicate the corresponding change in position of the CCRV throttle. If yes, routine 200 proceeds to 210 to not diagnose the CCRV for degradation of either the position sensor or the CCRV throttle. Routine 200 then ends. If at 208 the position sensor does not signal the expected change in position, routine 200 continues to 212 to determine degradation of the CCRV. At 214, further diagnosis of the CCRV may be initiated by activating routine 300 of FIG. 3 to identify if the degradation of the CCRV includes degradation of the position sensor and/or degradation of the CCRV throttle. Alternatively, in some embodiments, routine 200 may activate a diagnostic code indicating CCRV degradation and request activation of routine 500 of FIG. 5 via operator input after 212. For example, routine 500 may be activated by operator input at a service center, dealership, or other similar locations offering repair. Routine 200 then ends.

Figure 3:
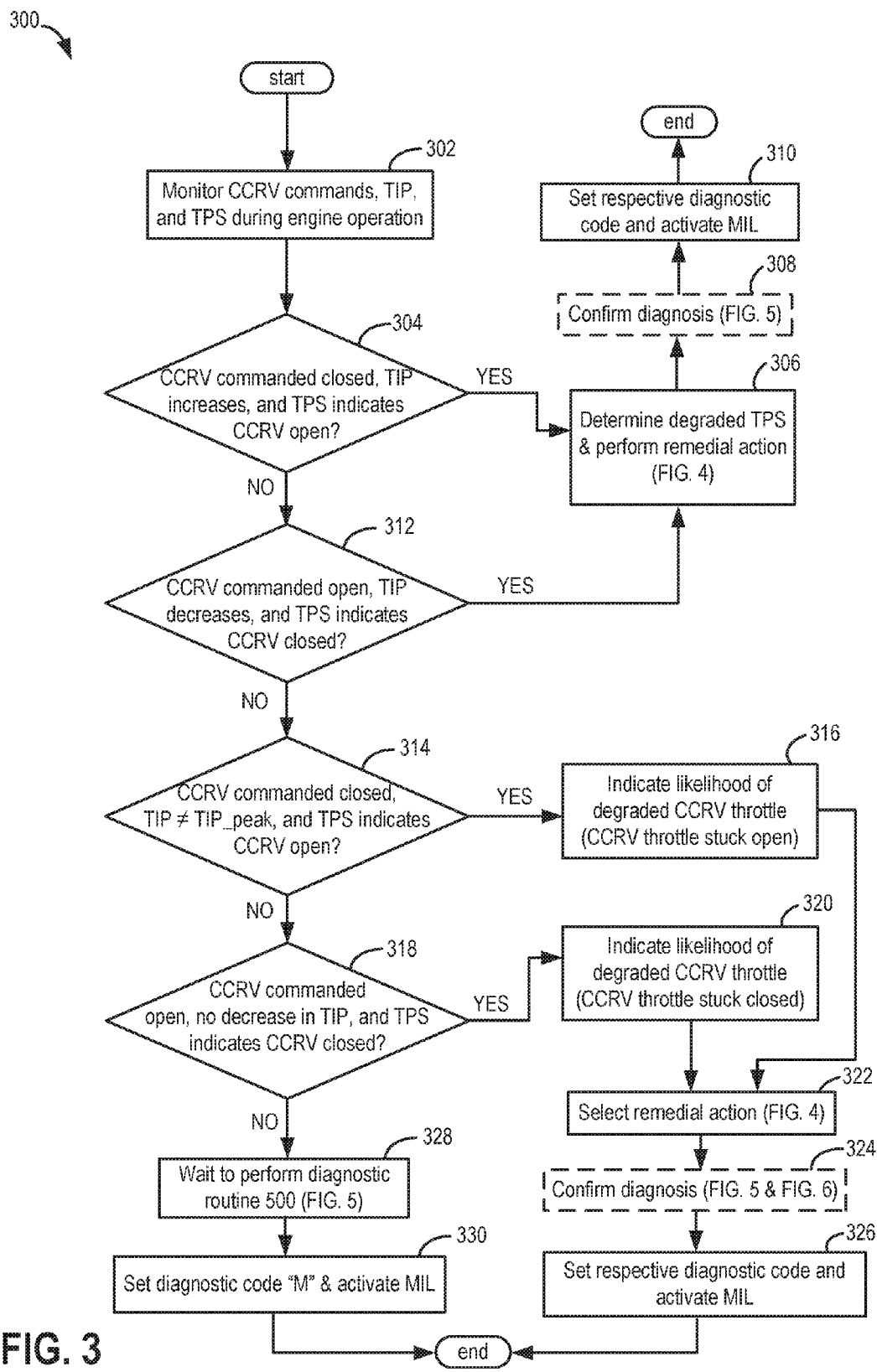
FIG. 3 shows a high level flow chart illustrating a routine during engine operation to differentiate between degradation of a throttle of the CRV and degradation of a position sensor of the CRV.
Figure 4:
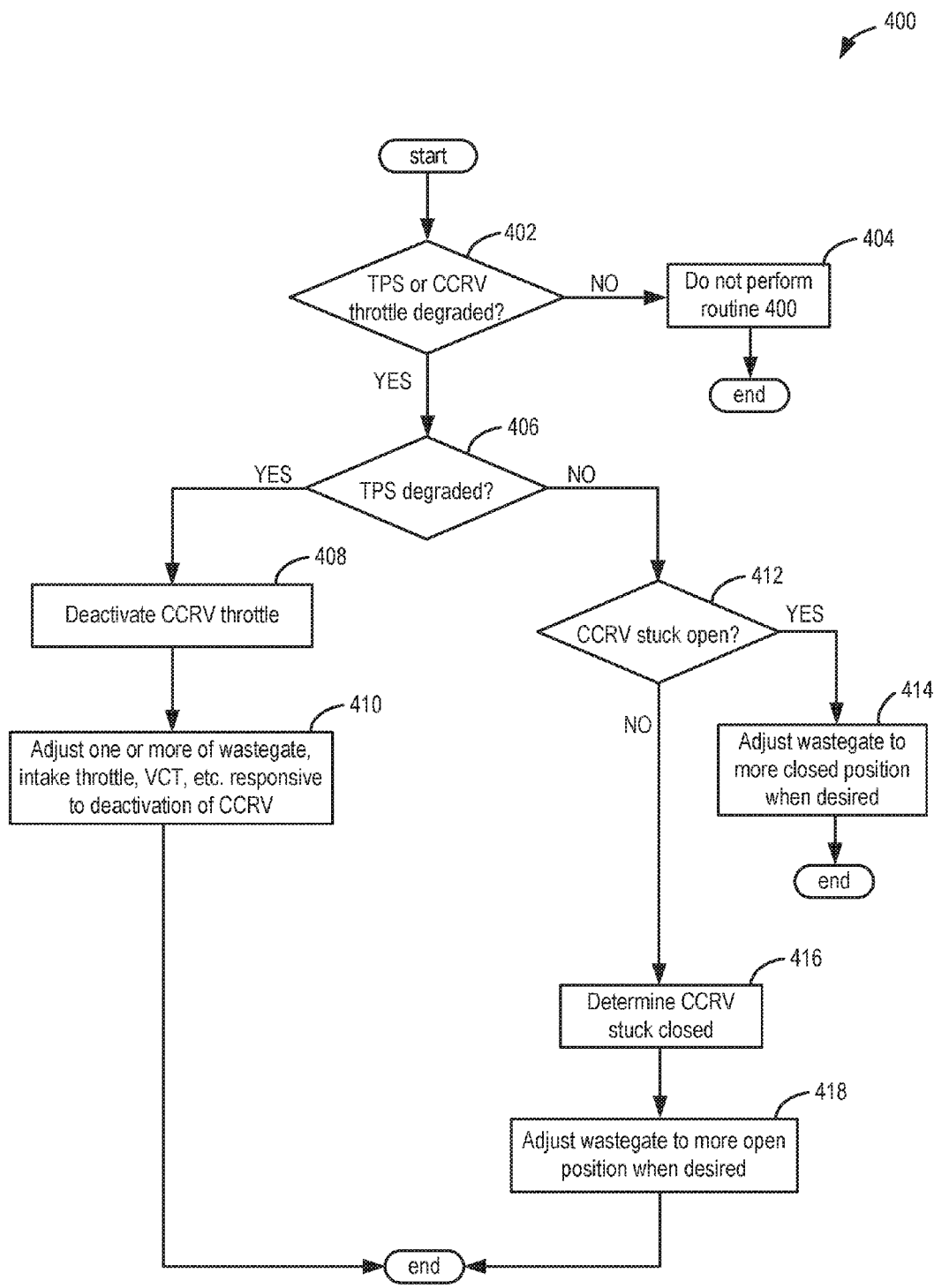
FIG. 4 presents a high level flow chart comparing example corrective adjustments in response to the determination of degradation in the throttle of the CRV with those in response to the determination of degradation of the position sensor of the CRV.

When CCRV degradation is determined, the controller may attempt to use existing engine conditions with resulting actuator commands (e.g. commands to CCRV) to differentiate between degradation of the throttle of the CCRV and degradation of the position sensor of the CCRV (via routine 300 of FIG. 3). This diagnosis may be further confirmed by operator input via routines 500 (of FIG. 5) and 600 (of FIG. 6). Routines 500 and 600 may be utilized additionally or alternatively to routine 300. If the existing engine conditions and resulting actuator commands cannot isolate component specific degradation in the CCRV, further diagnoses may be conducted via operator input as shown in routines 500 (of FIG. 5) and 600 (of FIG. 6).

Turning now to FIG. 3, it depicts routine 300 for identifying component specific degradation in the CCRV during engine operation. Specifically, the routine may diagnose for degradation of the position sensor (TPS) and/or CCRV throttle based on TIP, the output of the position sensor, and commanded changes to the CCRV. It will be appreciated that routine 300 may be performed without operator input or manual commands when the engine is operational.

At 302, routine 300 monitors commands to the CCRV, resulting changes in TIP as communicated from the TIP sensor (e.g. TIP sensor 173 of FIG. 1), and corresponding readings from the position sensor, if any. At 304, routine 300 determines if the CCRV has been commanded closed, and if there is a resulting increase in TIP while the output of the position sensor indicates that the CCRV is open. For example, the CCRV may be commanded closed if a tip-in event is occurring to enable higher levels of boost. In one example, the CCRV throttle may be commanded to a fully closed position from a fully open position. In another example, the CCRV throttle may be commanded to a fully closed position from a mostly open position. In yet another example, the CCRV throttle may be commanded to a mostly closed position from a mostly open position. If an increase in TIP is measured by the TIP sensor, the CCRV throttle may be in its commanded closed position. As such, the CCRV throttle may be in a fully closed position such that no airflow or nominal airflow may occur through compressor recirculation passage 150 in FIG. 1. However, if the TPS sensor output does not indicate the corresponding change in position of the CCRV throttle, routine 300 may continue to 306 to determine a likelihood of degradation in the position sensor of the CCRV. Thus, routine 300 continues to 306 if the CCRV has been commanded closed with a resulting increase in TIP while the output of the position sensor indicates that the CCRV is open. Herein, the TPS may indicate that the CCRV throttle is at an open position, which may be the initial position of the CCRV throttle before receiving the command to close from the controller at 304.

At 306, routine 300 may activate routine 400 of FIG. 4 to provide remedial action in response to the determination of likelihood of degradation of the position sensor of the CCRV. For example, the determination of degradation of the position sensor may be followed by deactivating the CCRV. Consequently, boost and surge conditions may be controlled, in one example, by adjusting the wastegate coupled across the exhaust turbine of the turbocharger. In other examples, one or more of the intake throttle, variable cam timing, and turbocharger vanes may be adjusted in response to the deactivation of the CRV. Next, at 308, the determination of likelihood of TPS degradation may be further confirmed (optionally) by routine 500 of FIG. 5. As such, the routine of FIG. 5 may be activated via operator input, for example, at an auto repair shop. Further, at 310, in response to the determination of TPS degradation, a diagnostic code may be set indicating the likelihood of TPS degradation and a malfunction indicator lamp (MIL) may be activated to notify the vehicle operator.

Returning to 304, if routine 300 determines that the CCRV is not commanded closed without a resulting increase in TIP while the output of the position sensor indicates that the CCRV is open, routine 300 progresses to 312 to confirm if the CCRV is commanded open with a resulting decrease in TIP while the TPS output indicates that the CCRV is closed. For example, the CCRV may be commanded open if surge conditions are indicated. In one example, the CCRV throttle may be commanded to a fully open position from a fully closed position. In another example, the CCRV throttle may be commanded to a fully open position from a mostly closed position. In yet another example, the CCRV throttle may be commanded to a mostly open position from a partly open position. If a decrease in TIP is measured by the TIP sensor, the CCRV throttle may be in its commanded open position. Herein, if the TPS output indicates that the CCRV throttle is in a closed position (or mostly closed position), routine 300 continues to 306 to determine a likelihood of degradation in the position sensor of the CCRV. Thus, routine 300 may proceed to 306 if the CCRV has been commanded open with a resulting increase in TIP while the output of the position sensor indicates that the CCRV is open. The TPS may indicate that the CCRV throttle is at a closed position, which may be the initial position of the CCRV throttle before receiving the command to open from the controller at 312.

At 306, as explained earlier, routine 400 of FIG. 4 may be actuated for corrective action in response to the determination of likelihood of degradation of the position sensor of the CRV. At 308, the determination of likelihood of TPS degradation may be further confirmed (optionally) by routine 500 of FIG. 5. Further, at 310, in response to the determination of TPS degradation, a diagnostic code may be set indicating the likelihood of TPS degradation and the MIL may be activated to notify the vehicle operator.

Returning to 312, if it is determined that the CCRV is not commanded open, routine 300 proceeds to 314 to confirm if an existing engine condition demands a closure of the CCRV. For example, the CCRV may be commanded to the fully closed position. Further, at 314, it may be confirmed if measured TIP is not substantially equal to an expected peak TIP, and if the TPS output indicates that the CCRV throttle is at an open (or mostly open) position. As such, for a given model of an engine including a given size of CCRV, known restrictions in the path to the CCRV, specific design of each of the intake compressor(s) and exhaust turbine(s), specific engine size and design, and based on engine operating characteristics such as spark timing, intake throttle angle, fuel type, etc., a peak obtainable TIP may be known. Accordingly, if the expected TIP (e.g. peak TIP) does not match the measured TIP when the CCRV is commanded closed, while the TPS indicates that the CCRV throttle is at an open (or mostly open) position, the CCRV throttle may be determined to be degraded. Routine 300 continues to 316 if the CCRV has been commanded closed, and if the resulting increase in TIP is not equivalent to an expected peak TIP while the output of the position sensor indicates that the CCRV is open.

At 316, routine 300 determines a likelihood of degradation of the CCRV throttle. Specifically, CCRV throttle may be stuck in an open (or mostly open) position. If the CCRV throttle is lodged in an open position (or mostly open position), sufficient boost may not be developed and charging pressure at the inlet of the intake throttle may be lower than expected. Further, based on the determination of degradation of the CCRV throttle (e.g. stuck open), various corrective actions may be taken at 322 based on routine 400 of FIG. 4. Next, at 324, further confirmation of the degradation of the CCRV throttle may be performed via operator input. This may be an optional activation of either routine 500 of FIG. 5 or routine 600 of FIG. 6. At 326, a respective diagnostic code indicating the degraded throttle (e.g. throttle stuck open) may be set and the MIL may be activated. Routine 300 may then end.

If a closure of the CCRV is not commanded at 314, routine 300 continues to 318 to confirm if an existing engine condition demands an opening of the CCRV. Herein, the CCRV throttle may be commanded to a fully open (or mostly open) position from a closed (or mostly closed position). At 318, it may also be determined if the commanded opening of the CCRV does not produce a decrease in TIP and the TPS indicates that the CCRV throttle is closed (or mostly closed). For example, if the CCRV throttle does not change position as commanded to a more open position, TIP may remain at a higher level than desired. If the TPS indicates that the throttle of the CCRV has not moved, and remains in a closed (or mostly closed) position, the CCRV throttle may be degraded. Specifically, the CCRV throttle may be stuck in a closed (or mostly closed) position. Therefore, if a decrease in TIP is not measured by the TIP sensor in response to the commanded opening of the CCRV while the TPS indicates that the CCRV throttle is in the closed (or mostly closed) position, routine 300 continues to 320 to determine the likelihood of degradation of the CCRV throttle (e.g. stuck closed). Further, at 322, a corresponding corrective action may be initiated according to routine 400 of FIG. 4. Next, at 324, further confirmation of the degradation of the CRV throttle may be performed via operator input. This may be an optional activation of either routine 500 of FIG. 5 or routine 600 of FIG. 6. At 326, a respective diagnostic code indicating the degraded throttle (e.g. throttle stuck closed) may be set and the MIL may be activated. Routine 300 may then end.

Returning to 318, if the CRV is not commanded open (and a resulting change in TIP is not observed while TPS indicates that the CRV throttle is closed), routine 300 progresses to 328 to wait and perform diagnostic routine 500 via operator input. In addition, at 330, diagnostic code "M" may be set and the MIL may be activated. Herein, the diagnostic code "M" may indicate that further diagnosis via operator input is needed whereupon diagnostic routine 500 may be activated at a later time.

Thus, an example method for a boosted engine may comprise differentiating between degradation of a throttle of a compressor recirculation valve (CRV) and a position sensor of the CRV based on each of a throttle inlet pressure and commanded position of the throttle of the CRV. The CRV may be a continuously variable compressor recirculation valve (CCRV). The differentiating between degradation of the throttle of the CRV and the position sensor of the CRV may also be based on an output from the position sensor of the CRV in response to the commanded position of the throttle of the CRV. Further, the throttle inlet pressure may be measured upstream of an intake throttle positioned in an intake passage of the boosted engine. The method may further comprise indicating degradation of the position sensor based on a change in throttle inlet pressure responsive to a commanded change in a position of the throttle of the CRV and a lack of change in a response of the position sensor responsive to the commanded change in the position of the throttle of the CRV (as at either 304 or 312 of routine 300). In response to the indicating of degradation of the position sensor of the CRV, the method may include deactivating the CRV in response to the indicating of degradation of the position sensor of the CRV. Further, in response to the deactivating of the CRV, the method may comprise adjusting one or more of a wastegate, an intake throttle, and variable cam timing. The method may also include indicating degradation of the throttle of the CRV based on a lack of change in a response of the position sensor responsive to a commanded change in a position of the throttle of the CRV and a lack of change in throttle inlet pressure responsive to the commanded change in the position of the throttle of the CRV. Herein, degradation of the throttle of the CRV may include one of the throttle being stuck open and the throttle being stuck closed. Alternatively, or additionally, degradation of the throttle may include one or more of the throttle being partially stuck open and the throttle being partially stuck closed.

Another example method may comprise actuating a continuously variable compressor recirculation valve (CCRV), indicating degradation of the CCRV based on feedback from a position sensor of the CCRV indicating a throttle of the CCRV did not change position upon actuation, and differentiating between degradation of the throttle of the CCRV and the position sensor of the CCRV. The differentiating between degradation of the throttle of the CCRV and the position sensor of the CCRV may be based on throttle inlet pressure, the throttle inlet pressure measured by a sensor positioned upstream of an intake throttle and downstream of an intake compressor. The differentiating between degradation of the throttle of the CCRV and the position sensor of the CCRV may be further based on a commanded change in CCRV position, an expected change in throttle inlet pressure, and feedback from the position sensor of the CCRV.

For example, the method may comprise indicating degradation of the position sensor based on an increase in throttle inlet pressure in response to the CCRV being commanded to a closed position and feedback from the position sensor indicating the CCRV is open. In another example, the method may also include indicating degradation of the position sensor based on a decrease in throttle inlet pressure in response to the CCRV being commanded to an open position and feedback from the position sensor indicating the CCRV is closed. In yet another example, the method may further comprise indicating degradation of the throttle of the CCRV based on a lack of change in throttle inlet pressure in response to the CCRV being commanded to a closed position and feedback from the position sensor indicating the CCRV is open. Alternatively, the increase in throttle inlet pressure may not be equivalent to an expected rise in throttle inlet pressure in response to the CCRV being commanded to a closed position, and the position sensor may indicate that the CCRV is open. In an additional example, the method may indicate degradation of the throttle of the CCRV based on a lack of change in throttle inlet pressure in response to the CCRV being commanded to an open position and feedback from the position sensor indicating the CCRV is closed. Herein, the throttle inlet pressure may not decrease as expected when the CCRV is commanded to the open position.

Turning now to FIG. 4, it depicts example routine 400 demonstrating various adjustments that may be performed based on determination of degradation of the position sensor (TPS) of the CCRV throttle or degradation of the CCRV throttle (e.g. throttle stuck open or closed). Specifically, desired boost levels may be attained and surge control may be performed by adjusting positions of the wastegate, the intake throttle, valve timings, etc. It will be appreciated that routine 400 may be activated only after a determination of either TPS degradation or CCRV throttle degradation in routine 300 of FIG. 3.

At 402, routine 400 confirms that either TPS of the CCRV or CCRV throttle are degraded. As an example, either of the components of the CCRV may be determined to be degraded based on routine 300 of FIG. 3. If neither component is degraded, at 404 routine 400 may not be performed and may end. However, if degradation has been determined in the CCRV (e.g. either the TPS or the throttle), routine 400 continues to 406 where it may determine if the position sensor of the CCRV (specifically, the position sensor of the CCRV throttle) is degraded. For example, the TPS may be determined to be degraded by routine 300 of FIG. 3 based on a lack of change in the output of the position sensor when the CCRV is commanded to a closed position while an increase in TIP is measured in response to the command. In another example, the TPS may be determined to be degraded by routine 300 of FIG. 3 based on a lack of change in the output of the position sensor when the CCRV is commanded to an open position while a decrease in TIP is measured in response to the command.

If yes, routine 400 continues to 408 to deactivate the CCRV throttle since position control via the position sensor may not be achievable if the position sensor is degraded. Thus, the CCRV may be switched off and deactivated. Alternatively, if the position sensor is degraded, but the CCRV throttle is not, the CCRV throttle may be controlled in an open-loop manner based on manifold pressure, for example. In this way, greater engine capability is enabled relative to a condition where the CCRV throttle is completely deactivated. Next, at 410, routine 400 may adjust one or more of a position of the wastegate, the intake throttle, valve timing (e.g. variable cam timing) etc. responsive to the deactivation of the CCRV and based on existing engine conditions. In one example, if surge control is desired, the wastegate may be adjusted to a more open position enabling a reduction in boost levels. Alternatively, an opening of the intake throttle may be adjusted to reduce surge conditions. In another example, if a higher level of boost is desired, the wastegate may be moved to a more closed position. Airflow may also be adjusted by modifying valve timings in the cylinders of the engine. Further still, if the turbocharger in the engine is a variable geometry turbocharger, the controller may adjust the position of the turbine impeller blades (or vanes) to vary the level of energy that is imparted to the compressor. Routine 400 may then end.

If, at 406 it is determined that the position sensor is not degraded in the CCRV, routine 400 continues to 412 to confirm if the CCRV throttle is degraded and stuck in an open (or mostly open) position. If yes, at 414, the wastegate may be adjusted to a more closed position to enable a higher level of boost when desired. As explained earlier, the CCRV may bleed boost if stuck in an open (or mostly open) position and may affect torque delivery. Accordingly, the wastegate may be moved to a fully closed (or mostly closed) position to direct an entire portion of exhaust gases to the exhaust turbine of the turbocharger enabling a buildup of boost. If at 412 it is determined that the CCRV throttle is not stuck open, routine 400 continues to 416 to determine that the CCRV throttle is stuck closed. Further, at 418, the wastegate may be adjusted to a more open position based on engine conditions. For example, if the CCRV throttle is stuck in a closed (or mostly closed) position, surge control may not be possible. Accordingly, if pressure downstream of the intake compressor(s) increases, the wastegate may be opened to reduce turbocharger speed and charging pressure at the inlet of the intake throttle.

In this way, various actuators may be adjusted differently when the position sensor of the CCRV is determined to be degraded relative to when the CCRV throttle is determined to be degraded.

Figure 5:
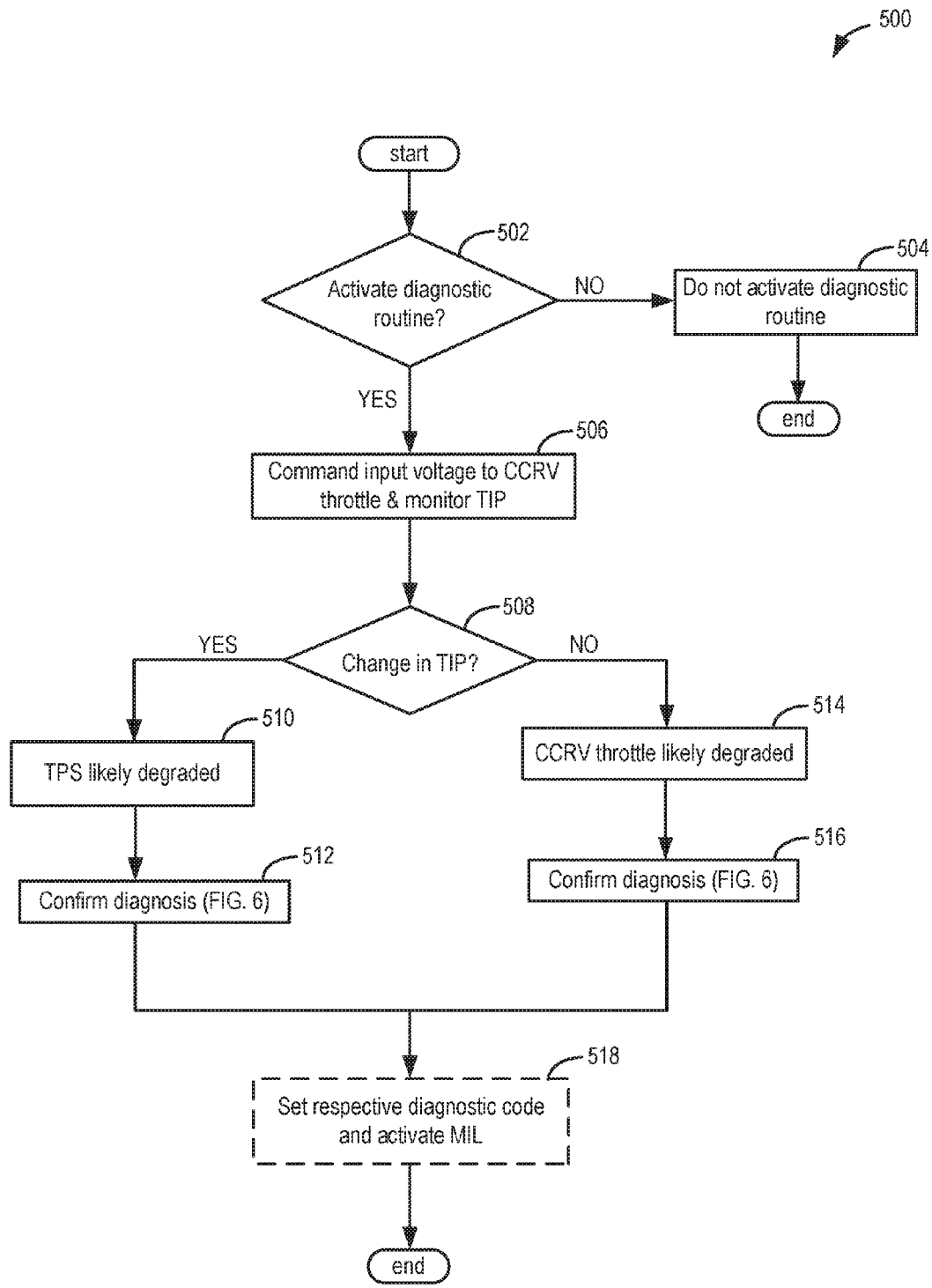
FIG. 5 is a high level flow chart illustrating a routine that may be implemented via operator input to determine if CRV degradation is due to degradation of the position sensor or the throttle of the CRV.

Turning now to FIG. 5, it shows example routine 500 illustrating a diagnostic routine to distinguish between degradation of the TPS in the CCRV and degradation of the CCRV throttle. As such, routine 500 may be activated by a controller based on operator input such as that at a dealership, service center, or a repair shop. Further, routine 500 may be activated by manual command after an initial determination of CCRV degradation, e.g. at 212 of routine 200.

At 502, the controller may confirm activation of the diagnostic routine. Herein, an operator may activate the diagnostic routine, as in routine 500. If confirmation is not received, routine 500 may not be activated at 504, and may end. However, if confirmation is received at 502, routine 500 progresses to 506 where an input voltage is commanded to the CCRV throttle while TIP is monitored. The input voltage, in one example, may adjust the CCRV throttle to a fully open position from a fully closed position. In another example, the input voltage may adjust the CRV throttle to a fully closed position from a mostly open position.

Next, at 508, it may be determined if a change in TIP is measured by the TIP sensor. In one example, if the CCRV throttle is moved to the fully closed position, an increase in TIP may be measured by the TIP sensor if the CCRV throttle is not degraded. If the CCRV throttle is degraded, there may be no increase in TIP upon receiving the input voltage. Alternatively, the measured increase in TIP may not be equal to an expected rise in TIP responsive to the commanded voltage to close the CCRV throttle if the CCRV throttle is degraded. In another example, a decrease in TIP may be measured if the CCRV throttle is not degraded and is adjusted to an open position. However, if the CCRV throttle is degraded (e.g. stuck closed), there may be a nominal decrease in TIP. Alternatively, there may be no measurable decrease in TIP if the CCRV throttle is degraded and stuck closed.

Therefore, at 508, if routine 500 determines that a change in TIP is observed in response to the input voltage, and that the change in TIP is substantially equivalent to an expected change, routine 500 continues to 510 to determine that the TPS is degraded. However, the measured change in TIP may be due to noise factors such as changes in spark timing, alterations in pedal position, transmission gear changes, etc. Accordingly, routine 500 continues to 512 to confirm the diagnosis of TPS degradation by activating routine 600 of FIG. 6. In another example, the diagnosis may be deemed complete at 510 and the position sensor of the CCRV may be determined to be degraded. At 518, an optional diagnostic code indicating TPS degradation may be set and a MIL may be activated. As such, if engine operation were to continue after this determination of TPS degradation, the CCRV may be deactivated and switched off.

If at 508, routine 500 determines that there is no change in TIP, it may be confirmed at 514 that the CCRV throttle is degraded. Alternatively, CCRV throttle may be determined to be degraded if routine 500 confirms that the change in TIP is not equivalent to an expected change in TIP. The CCRV throttle may be degraded such that the throttle is stuck in an open (or mostly open) position. In another example, the CCRV throttle may be degraded such that it is stuck in a closed (or mostly closed) position. To further confirm the diagnosis that the CCRV throttle is degraded, routine 500 may proceed to 516 to activate routine 600 of FIG. 6. Routine 600 will be further described below. At 518, a diagnostic code indicating CCRV throttle degradation may be set and the MIL may be activated.

In this manner, an operator activated routine may be performed to determine if CCRV degradation is due to degradation of the position sensor in the CCRV or due to degradation of the CCRV throttle. By commanding an input voltage to the CCRV throttle via operator input, a more accurate diagnosis may be made. Further, repairs may be performed in a shorter duration by identifying which of the components of the CCRV is degraded.

Figure 6:
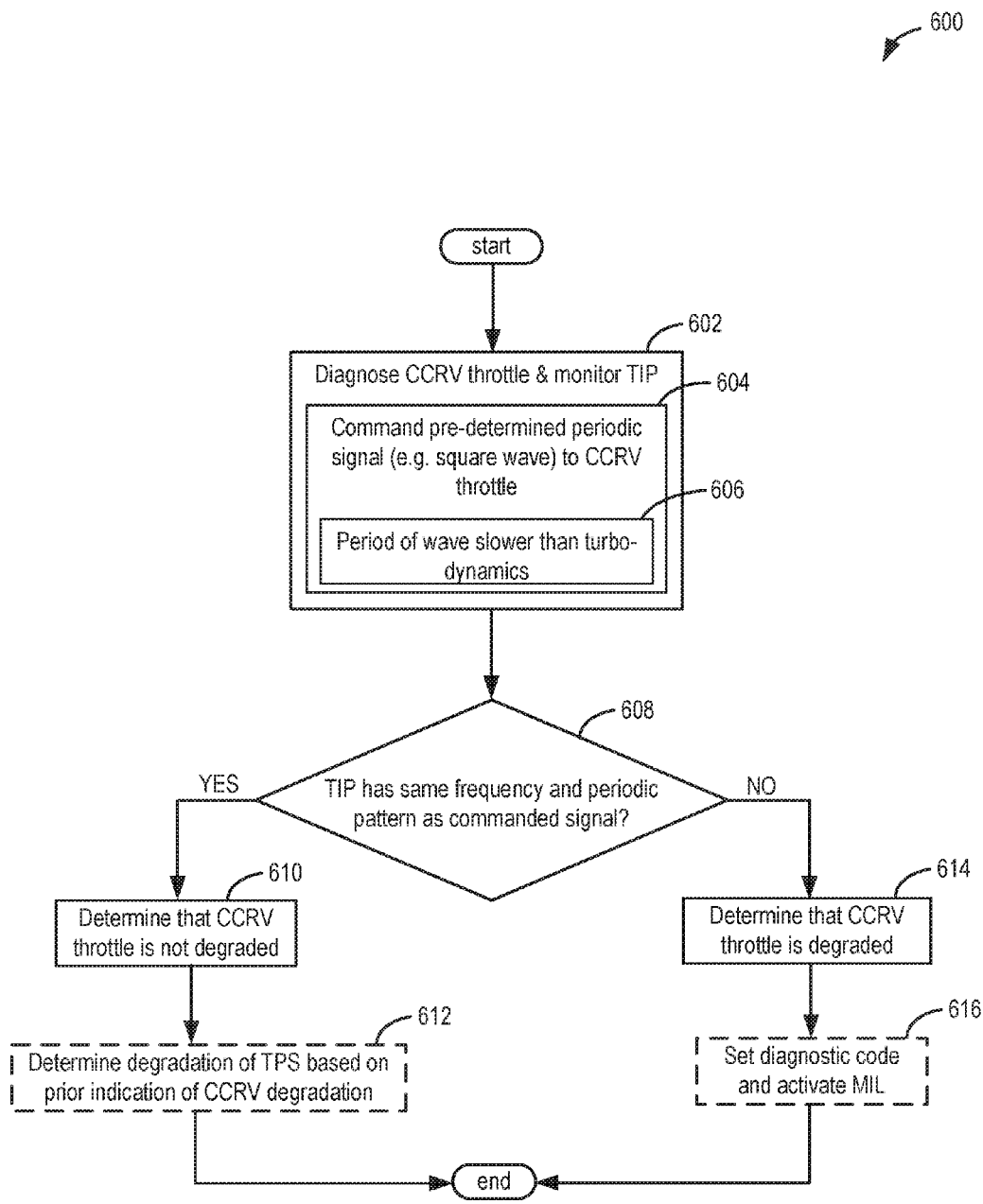
FIG. 6 depicts a high level flow chart for establishing degradation in the CRV while reducing noise factors that may affect throttle inlet pressure.
Figure 7:
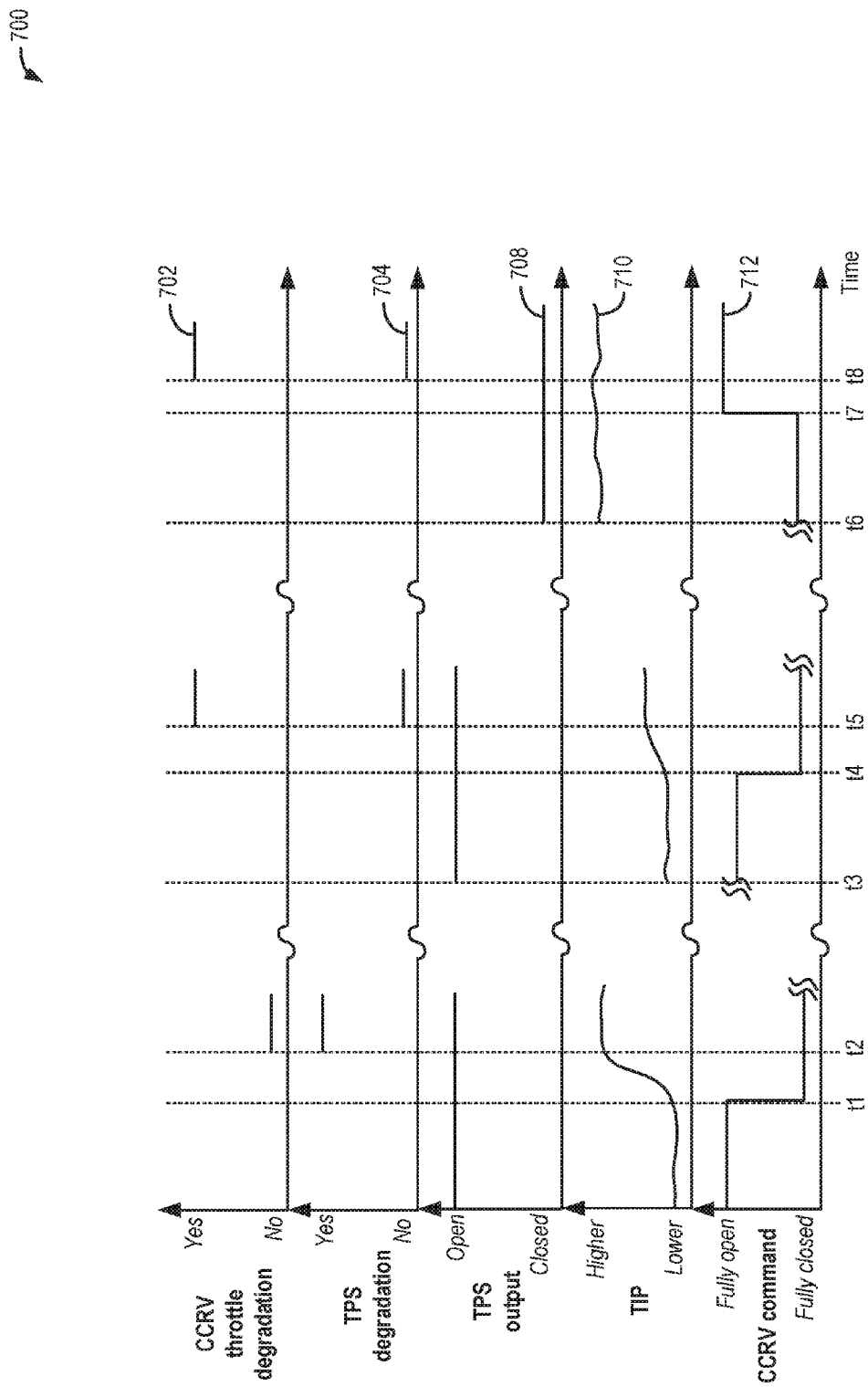
FIG. 7 demonstrates an example operation for differentiating between degradation in the position sensor of the CRV and degradation of the throttle of the CRV.

FIG. 6 portrays example routine 600 for ensuring that changes in TIP are primarily due to adjustments in the position of the CCRV throttle. Further, routine 600 may also provide an additional, and more reliable, method for diagnosing degradation in the CCRV throttle. Herein, a periodic signal may be commanded to the CCRV throttle and corresponding changes in TIP may be monitored to determine CCRV degradation.

At 602, the CCRV throttle may be diagnosed by commanding a periodic signal to the CCRV throttle and monitoring changes in TIP responsive to changes in CCRV throttle position. The periodic signal may be pre-determined and may be commanded by the controller based on operator input. Routine 600 may command a periodic signal that has a square waveform at 604. Further, at 606, routine 600 includes commanding a periodic signal that has a periodicity (or period) based on a response time of the turbocharger. In one example, the periodicity (or period) of the square waveform may be slower than dynamics of the turbocharger. To elaborate, the period of the square waveform periodic signal may be slower than the response time of the turbocharger. As such, the period of the square wave may be of sufficient duration to allow the turbocharger and engine system to settle after each edge of the square wave.

For example, if the CCRV is commanded open by a first edge of the periodic signal and the CCRV throttle shifts to a more open position from a more closed position, the TIP may decrease initially. In response to this decrease in TIP, the wastegate may be adjusted by the controller to a more closed position to return the TIP to a target pressure. The target pressure may be a boost pressure selected for the existing engine condition. Changes in TIP as a result of adjustments to CCRV throttle position may, therefore, be transient. Thus, the square waveform may have a period that is of adequate duration to enable a re-adjustment of the TIP to its target value. It will be appreciated that instead of a square waveform, a rectangular waveform may be commanded as the periodic signal.

Returning to routine 600, at 608, it may be determined if observed changes in TIP substantially correspond to the periodicity of the periodic signal. For example, it may be determined if the changes in TIP have a similar frequency and periodic pattern as the commanded periodic signal to the CCRV throttle. It will be noted that, as explained above, the changes in TIP may be transient such that TIP may initially increase (or decrease) in response to the closing (or opening) of the CCRV throttle but the TIP may later decrease (or respectively increase) as the wastegate and/or other actuators are adjusted to restore TIP to the target pressure.

If it is determined at 608 that changes in TIP substantially match the periodic pattern and frequency of the commanded signal to the CCRV throttle, routine 600 continues to 610 to determine that the CCRV throttle is not degraded. In essence, the throttle of the CCRV shifts according to the periodic signal command provided to the CCRV throttle from the controller.

For example, the square waveform of the periodic signal may alter the position of the CCRV throttle from a fully open position to a fully closed position. Due to the selected period of the square waveform, the CCRV throttle may be maintained in its position of either fully closed or fully open for sufficient duration to enable the change in TIP to be restored to the target pressure. Therefore, if the CCRV throttle is not stuck open (or not stuck closed) and if it shifts according to the periodic command signal, TIP may change in accordance with the shifts of the CCRV throttle. To elaborate, in one example, if the CCRV throttle is transitioned from the fully open position to the fully closed position, TIP may increase significantly at first. Later, the TIP may be reduced to the target value by actuating the wastegate to a more open position. Once the target pressure is attained and the engine and turbocharger system are settled at a given condition, the periodic signal may transition the CCRV throttle from the fully closed position to the fully open position. In response to this transition, a significant decrease in TIP may be measured initially by the TIP sensor. However, this decrease may be transient in that the wastegate may be adjusted to a more closed position to return the TIP to its target value. Thus, at each edge of the commanded periodic signal, TIP may change substantially if the CCRV throttle is not stuck open (or stuck closed). At a later time, TIP may be restored to the pre-determined target pressure. In one example, an actuator other than the wastegate may be adjusted to return TIP to the target pressure, such as the intake throttle and/or valve timing and/or valve lift. However, such actions may impact engine torque, and require still further countermeasures, such as a transmission shift, adjustment of spark timing, etc.

Optionally, upon establishing that the CCRV is not degraded at 610, routine 600 may continue to 612 to indicate that the position sensor of the CCRV is degraded. Herein, the position sensor may be determined to be degraded based on a prior indication of CCRV degradation such as that at 212 of routine 200, or prior indication of TPS degradation such as at 306 of routine 300, and 510 of routine 500. It will be noted that the prior indications of CCRV degradation and/or TPS degradation may be based upon a commanded change in CCRV position that does not include a periodic signal command. Routine 600 may then end.

In another example, upon establishing that the CCRV is not degraded at 610, the position sensor of the CCRV may be determined to be degraded if a commanded change in CCRV position at a later time, following determining CCRV throttle robustness, does not produce a corresponding change in the response of the position sensor.

On the other hand, if it is confirmed at 608 that changes in TIP do not substantially correspond to the periodic pattern and frequency of the commanded signal to the CCRV throttle, routine 600 continues to 614 to determine that the CCRV throttle is degraded. Herein, the throttle of the CCRV may not shift according to the periodic signal command provided to the CCRV throttle from the controller. Accordingly, the CCRV throttle may be lodged in a fully open, fully closed, or a position there-between. At 616, routine 600 may optionally indicate a respective diagnostic code indicating a stuck CCRV throttle (stuck open or stuck closed) to the operator and the MIL may be actuated.

Thus, an example system may comprise an engine, a turbocharger for providing a boosted aircharge to the engine, the turbocharger including an exhaust turbine and an intake compressor, an intake throttle positioned in an intake passage downstream of the intake compressor, a wastegate coupled across the turbine, a continuously variable recirculation valve (CCRV) coupled across the compressor, the CCRV including a CCRV throttle and a CCRV position sensor, a throttle inlet pressure (TIP) sensor coupled to the intake passage upstream of the intake throttle and downstream of the intake compressor. The example system may further comprise a control system with computer-readable instructions stored on non-transitory memory for commanding a periodic signal to the CCRV, measuring changes in pressure at an inlet of the intake throttle via the TIP sensor, and if the changes in pressure at the inlet of the intake throttle in response to the commanded periodic signal do not correspond to a frequency of the commanded periodic signal, indicating degradation of the CCRV throttle. The control system may include further instructions for, if the changes in pressure at the inlet of the intake throttle in response to the commanded periodic signal substantially correspond to the frequency of the commanded periodic signal, not indicating degradation of the CCRV throttle.

Further still, the control system may include additional instructions for indicating degradation of the CCRV position sensor based on a first determination of degradation of the CCRV, and the changes in pressure at the inlet of the intake throttle in response to the commanded periodic signal substantially corresponding to the frequency of the commanded periodic signal. The first determination of degradation of the CCRV may include a diagnosis such as that made at 212 in routine 200. Therefore, the first determination of degradation of the CCRV may include a lack of change in an output of the CCRV position sensor responsive to a first commanded change in position of the CCRV (such as that at 206 in routine 200), the first commanded change being distinct from the periodic signal. Alternately, the first determination of degradation of the CCRV may include the determination of degradation of the TPS sensor at 510 in routine 500 followed by a confirmation in routine 600. Herein, if the position sensor is determined to be degraded in routine 500, routine 600 may confirm this diagnosis of TPS degradation when changes in TIP correspond substantially to the periodic signal commanded to the CRV throttle. It will be noted that in both cases (whether routine 500 or routine 200), the first commanded change in position of the CCRV is distinct from the periodic signal command. Further, the first commanded change in position may not be a periodic signal command. The periodic signal may include a square waveform with a period based on response time of the turbocharger. Alternatively, the periodic signal may include a rectangular waveform with a period based on response time of the turbocharger. Furthermore, the control system may include further instructions for, deactivating the CCRV and adjusting one or more of the wastegate, a position of the intake throttle, and valve timing upon deactivating the CCRV in response to the indication of degradation of the position sensor of the CCRV.

FIG. 7 depicts an example comparison of identification of degradation of the position sensor of the CRV relative to that of the CRV throttle in an example engine system such as that of FIG. 1. Map 700 of FIG. 7 shows CCRV throttle degradation at plot 702, CCRV position sensor (TPS) degradation at plot 704, output from CCRV position sensor (TPS) at plot 708, TIP as measured by the TIP sensor at plot 710, and CCRV command at plot 712. All the above are plotted against time on the x-axis. Further, time is depicted increasing from left to right along the x-axis. It will be noted that map 700 presents three separate degradation determinations at three distinct events.

Prior to t1, the CCRV may be maintained at a fully open position as demonstrated by the command to the CCRV. TIP as measured by the TIP sensor (plot 710) is lower since the CCRV is at the fully open position. Further, the output of the TPS indicates that the CCRV throttle is at the open position. At t1, the controller may command a change in position of the CCRV. As shown at t1, the CCRV may be commanded to a fully closed position from the fully open position existing prior to t1. The output of the TPS, in response to this command at t1, does not change and the TPS continues to depict the CCRV (or CCRV throttle) in its open position. However, an increase in TIP is measured between t1 and t2 indicating that the position of the CCRV throttle has transitioned from the fully open position to the fully closed. Accordingly, at t2, degradation of the position sensor of the CRV in indicated (plot 704) while plot 702 shows that there is no degradation of the CCRV throttle. Thus, the controller may indicate degradation of the position sensor based on an increase in throttle inlet pressure in response to the CCRV being commanded to a closed position and feedback from the position sensor indicating the CCRV is open.

Between t2 and t3, a duration of time may elapse wherein the position sensor of the CRV may be repaired or replaced such that at t3 the position sensor functions in a substantially robust manner. At t3, the engine may be operational with the CCRV in a mostly open position as commanded (plot 712). Further, the TPS indicates that the CCRV throttle is mostly open and TIP may be lower at t3 due to the CCRV being at the mostly open position.

At t4, the CCRV (and the CCRV throttle) may be commanded closed to the fully closed position. For example, a higher level of boost may be demanded due to a rise in torque demand resulting in the CCRV being commanded to the fully closed position. As will be observed, TIP does not rise as would be expected if the CCRV throttle had closed (plot 710). Herein, a peak TIP may be expected due to the CCRV being commanded to the fully closed position. The observed rise in TIP, though, is nominal while the TPS output undergoes no change and may indicate that the CCRV throttle continues at its open position. In one example, TPS may indicate a partially open/partially closed position of the CCRV throttle, although the signal-to-noise ratio may be smaller when the CCRV is stuck closer to the desired position. When stuck farther from desired position, degradation may be more quickly identified and indicated. Therefore, at t5, the CCRV throttle may be determined to be degraded based on the lack of change in response of the position sensor and substantially no change in TIP in response to the commanded change in position of the CCRV throttle. The CCRV throttle may be stuck open and boost may not increase sufficiently. In response to this determination of the CCRV throttle being stuck open, the controller may adjust the wastegate to a fully closed position to provide higher levels of boost.

Between t5 and t6, adequate time may pass to repair the CCRV throttle such that the throttle is dislodged from its stuck position. At t6, the engine may be operating with the CCRV (and the CCRV throttle) in a fully closed position. TPS output indicates that the CCRV throttle is closed and TIP is higher, possibly at peak TIP, indicating the same. At t7, the controller may command a change in position of the CCRV throttle from the fully closed position to the fully open position. However, there may be no change in TIP in response to this command (plot 710) and the TPS output (plot 708) may not indicate a change in the position of the CCRV. As such, the CCRV throttle may be stuck closed. Therefore, at t8, CCRV degradation may be indicated while the TPS is depicted as robust. Thus, the controller may indicate degradation of the CCRV throttle based on a lack of change in throttle inlet pressure in response to the CCRV being commanded to an open (or fully open) position, and feedback from the position sensor indicating that the CCRV is closed.

Thus, an example system may comprise an engine, a turbocharger for providing a boosted aircharge to the engine, the turbocharger including an exhaust turbine and an intake compressor, an intake throttle positioned in an intake passage downstream of the intake compressor, a wastegate coupled across the turbine, a continuously variable recirculation valve (CCRV) coupled across the compressor, the CCRV including a CCRV throttle and a CCRV position sensor, a throttle inlet pressure (TIP) sensor coupled to the intake passage upstream of the intake throttle and downstream of the intake compressor. The example system may further comprise a control system with computer-readable instructions stored on non-transitory memory for actuating a change in position of the CCRV, determining degradation of the CCRV based on feedback from the CCRV position sensor indicating the CCRV throttle did not change position in response to the actuating, and during a first condition, indicating degradation of the CCRV position sensor, and during a second condition, indicating degradation of the CCRV throttle. The first condition may include an expected change in throttle inlet pressure measured by the throttle inlet pressure sensor in response to the actuating, and wherein the second condition may include substantially no change in throttle inlet pressure measured by the throttle inlet pressure sensor. The control system may include further instructions for deactivating the CCRV in response to the determining of degradation of the CCRV, and for adjusting one or more of the wastegate, the intake throttle, and valve timing in response to the deactivating of the CCRV.

Turning now to FIG. 8, it displays map 800 portraying an example diagnosis of the CCRV throttle in an example engine system such as engine system 100 of FIG. 1, based on a periodic signal command. This example diagnosis using the periodic signal command may reduce noise in TIP from other factors such as changes in spark timing, pedal position, gear, etc.

Map 800 includes CCRV throttle degradation at plot 802, CCRV position sensor (TPS) degradation at plot 804, indication of CCRV degradation (as a whole unit) at plot 806, output from CCRV position sensor (TPS) at plot 808, TIP as measured by the TIP sensor at plot 810, and CCRV command at plot 812. All the above are plotted against time on the x-axis. Further, time is depicted increasing from left to right along the x-axis. Line 811 represents a target throttle inlet pressure that the engine may be operating at during the determination of CCRV degradation.

Prior to t1, the engine may be operated by a user away from a dealership, service center, repair shop, etc. in an everyday manner. Further, the engine may be operating with the CCRV (and CCRV throttle) in a fully open position. This position of the CCRV throttle is indicated by the TPS output. TIP may not be actively monitored for CCRV diagnosis until a likelihood of CCRV degradation (such as at 212 of routine 200) is indicated. Therefore, TIP may not be measured in response to the CCRV command until t3. At t1, the CCRV may be commanded to a fully closed position. However, TPS response indicates that there is no change in CCRV throttle position at t1 in response to the commanded change in CCRV throttle position. Accordingly, at t2, the controller may indicate that the CCRV is likely degraded. In one example, this may be recorded as a first determination of degradation of the CCRV.

In response to the indication of CCRV degradation, determination of CCRV component specific degradation may be initiated at t3 by operator input at the dealership, service center, or repair shop. As will be noted, a duration of time may elapse between detection of CCRV degradation at t2 and component specific diagnosis at t3. For example, between t2 and t3, while the engine is operated by the user, the controller may attempt to distinguish between degradation of the CCRV throttle and the CCRV position sensor (e.g. via routine 300 of FIG. 3). In this example, the example diagnosis depicted after t3 may be performed to confirm a previous diagnosis of likely degradation.

Between t3 and t4, the engine may be operating with a TIP that is substantially similar to a target TIP (line 811) with the CCRV at the fully open position. As such, target TIP with the CCRV at fully open position may be achieved by adjusting the opening of the intake throttle located downstream of the intake compressor and/or by adjusting the opening of the wastegate.

At t4, a periodic signal in the form of a square waveform may be commanded to the CCRV throttle as shown in plot 812. Further, variations in TIP may be monitored (plot 810) in response to this periodic signal. As shown in plot 810, changes in TIP substantially follow a similar frequency and periodic pattern as the commanded periodic signal to the CCRV between t4 and t9. The commanded periodic signal may have a sufficiently slow period that ensures adequate time is available for turbocharger response. Further, each change in position of the CCRV throttle results in a change in TIP that may be transient. To elaborate, at t4, the periodic signal may command adjusting the CCRV to the fully closed position. If the CCRV throttle responds to this command (and is not degraded) and transitions to the fully closed position, a substantial increase in TIP (above target TIP of line 811) may be observed at t4 in response to the transition. However, since the target TIP is lower than this increased level of TIP, the wastegate may be adjusted to a more open position to decrease TIP. Alternatively, the opening of the intake throttle may be increased to reduce TIP. Accordingly, TIP reduces to the target pressure (line 811) at t5 before the periodic signal commands a change in CCRV position at t6. Thus, the period of the periodic signal may be sufficient to allow restoring TIP to the target pressure and maintain turbocharger dynamics.

At t6, the periodic signal commands a change in position of the CCRV from fully closed to fully open. In response to this command, the CCRV throttle may be adjusted to the fully open position (if not degraded) resulting in a considerable drop in TIP at t6. In response to this drop in TIP, the wastegate may be adjusted to a more closed position to increase TIP to its target pressure value. Alternatively, the intake throttle may be moved to a more closed position from a more open position to increase TIP. As observed, TIP attains the target pressure at t7 and at t8, the periodic signal may command a change in position of the CCRV from fully open to fully closed. The cycle may repeat itself until a sufficient number of transitions are observed. In the example shown, four transitions may be sufficient to determine whether the CCRV throttle is degraded or robust. In the example shown, the CCRV throttle is determined to be robust (and not degraded) since the changes in TIP substantially correspond to the frequency and pattern of the commanded periodic signal. Therefore, at t9, the controller may indicate that the TPS is degraded while the CCRV throttle is indicated as not degraded. As such, degradation of the TPS is based upon the first determination of CCRV degradation at t2 and the subsequent confirmation by applying the periodic signal.

Thus, an example method for a boosted engine may comprise commanding a periodic signal to a compressor bypass valve (CBV), and indicating degradation of a throttle of the CBV based on changes in pressure at an inlet of an intake throttle in response to the periodic signal. The pressure at the inlet of the intake throttle may be measured by a sensor coupled to an intake passage and located upstream of the intake throttle and downstream of an intake compressor of the boosted engine, such as TIP sensor 173 of FIG. 1. The periodic signal may be commanded by a controller of the boosted engine based on operator input. The periodic signal may include a square waveform, and the periodic signal may have a periodicity (or period) based on response time of a turbocharger of the boosted engine. The method may indicate degradation of the throttle of the CBV when changes in pressure at the inlet of the intake throttle do not substantially correspond to the periodicity of the periodic signal to the CBV. The method, on the other hand, may indicate degradation of a position sensor of the CBV when changes in pressure at the inlet of the intake throttle substantially correspond to the periodicity of the periodic signal, and when a second commanded change in a position of the throttle of the CBV does not produce a corresponding change in a response of the position sensor. The second commanded change may not be a periodic signal. The method may comprise deactivating the CBV in response to the indicating of degradation of the position sensor of the CBV. The method may further comprise adjusting one or more of a wastegate, the intake throttle, and variable cam timing responsive to the deactivating of the CBV. The CBV may be a continuously variable compressor bypass valve.

Another example method for a boosted engine may comprise commanding a periodic signal command to a compressor recirculation valve (CRV) comprising a square waveform, and distinguishing between degradation of a position sensor of the CRV and a throttle of the CRV based on changes in pressure at an inlet of an intake throttle in response to the square waveform periodic signal command. The periodic signal command may have a period slower than a response time of a turbocharger in the boosted engine, and the throttle of the CRV may be determined to be degraded when the changes in pressure at the inlet of intake throttle in response to the periodic signal command do not substantially correspond to the periodicity of the periodic signal. The position sensor of the CRV may be determined to be degraded when changes in pressure at the inlet of the intake throttle substantially correspond to the periodicity of the periodic signal command to the CRV, and when a second commanded change in a position of the throttle of the CRV does not produce a corresponding change in a response of the position sensor, the second commanded change being distinct from the periodic signal command.

In this way, degradation of the CCRV throttle may be differentiated from degradation of the position sensor of the CCRV. Specific component degradation may be identified by simply monitoring TIP and the output of the position sensor in the CRV in response to a command to the CRV by the controller. Thus, additional sensors for determining degradation in the CRV may not be needed. Further, component specific degradation may be more accurately identified by commanding a periodic signal command to the CCRV. Accordingly, repair of the CCRV may occur with lower expenses and within a shorter duration. Overall, engine maintenance may be more reliable and costs may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine;
a turbocharger for providing a boosted aircharge to the engine, the turbocharger including an exhaust turbine and an intake compressor;
an intake throttle positioned in an intake passage downstream of the intake compressor;
a wastegate coupled across the exhaust turbine;
a continuously variable recirculation valve (CCRV) coupled across the intake compressor, the CCRV including a CCRV throttle and a CCRV position sensor;
a throttle inlet pressure sensor coupled to the intake passage upstream of the intake throttle and downstream of the intake compressor; and
a control system with computer-readable instructions stored on non-transitory memory for:
  actuating a change in position of the CCRV;
  determining degradation of the CCRV based on feedback from the CCRV position sensor indicating the CCRV throttle did not change position in response to the actuating; and
  during a first condition, indicating degradation of the CCRV position sensor; and
  during a second condition, indicating degradation of the CCRV throttle.

2. The system of claim 1, wherein the first condition includes an expected change in throttle inlet pressure measured by the throttle inlet pressure sensor in response to the actuating, and wherein the second condition includes substantially no change in throttle inlet pressure measured by the throttle inlet pressure sensor.

3. The system of claim 1, wherein the control system includes further instructions for deactivating the CCRV in response to the determining of degradation of the CCRV.

4. The system of claim 3, wherein the control system includes further instructions for adjusting one or more of the wastegate, the intake throttle, and valve timing in response to the deactivating of the CCRV.

* * * * *